3,326,663
HERBICIDAL PHENYLUREAS
Samuel B. Soloway, Sittingbourne, Kent, England, and Kenneth D. Zwahlen, Modesto, Calif., assignors to Shell Oil Company, New York, N.Y., a corporation of Delaware
No Drawing. Filed Sept. 25, 1964, Ser. No. 399,327
17 Claims. (Cl. 71—2.6)

This invention relates to novel compounds useful in destroying and/or preventing growth of unwanted plants. In particular, this invention relates to a novel type of sulfur-containing phenylureas which have been found to be effective herbicides.

The compounds of this invention have been found to be active herbicides of a general type. That is, certain members of the class have been found to be herbicidally effective against a wide range of plant species. Others of the class are effective only against a limited number of plant species and are considered to be selective herbicides. With some of the compounds which are non-selective in their action, it is possible to use a dilute dosage to control the weed species and yet not harm the cultivated crop. Thus, at high or moderate dosages, while most of the compounds of the invention are powerful general herbicides, preventing growth of broad-leaved and narrow-leaved plants, low dosages may be employed, which may be quite selective, permitting control of weeds in crops.

The compounds of the invention are substituted phenylureas represented by the formula:

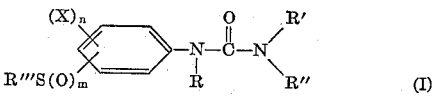

wherein $R'''$ represents unsubstituted alkyl of 1 to 12 carbon atoms or alkyl of 1 to 12 carbon atoms substituted by from one to a plurality of substituents of the group consisting of halogen, alkoxy of 1 to 4 carbon atoms, cyano, nitro, amino ($-NH_2$), monoalkylamino of 1 to 4 carbon atoms, dialkylamino of 2 to 8 carbon atoms, alkylamido of 2 to 4 carbon atoms, or alkenyl and mono- and poly- haloalkenyl of 2 to 4 carbon atoms; X represents halogen, alkyl of 1 to 4 carbon atoms, alkoxy of 1 to 4 atoms, unsubstituted amino ($-NH_2$), monoalkylamino of 1 to 4 carbon atoms, dialkylamino of 2 to 8 carbon atoms, nitro or cyano; $m=0-2$; $n=0-1$; R and R' each represent hydrogen or alkyl or alkenyl of 1 to 4 carbon atoms; and R'' represents alkyl, alkenyl or alkoxy of 1 to 4 carbon atoms.

An essential feature of compounds of this invention is the presence of the alkylthio group, either with or without an oxygen atom or atoms, as a substituent on the phenyl ring. The methylthio and corresponding sulfoxides and sulfones have been found to be particularly effective herbicides. When X represents middle halogen (chlorine or bromine) there results especially active compounds.

A preferred class of compounds of the invention because of their outstanding herbicidal activity are phenylthioureas represented by the following formula:

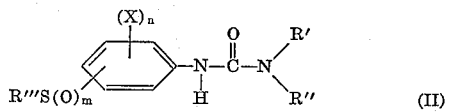

wherein X, $R'''$, $R''$, $R'$, $m$ and $n$ are as previously defined. When $R'''$ represents unsubstituted alkyl of 1 to 12 carbon atoms a subclass of especially effective herbicides results. Members of this subclass with $R'''$ having 1 to 6 carbon atoms exhibit high pre-emergent and post-emergent activity while the higher alkyl members of the group are effective post-emergent herbicides. Within this subclass are embodied a still further preferred subgroup of Formula II where $R'''$ is alkyl of 1–12 carbon atoms and R' and R'' are each alkyl of 1 to 4 carbon atoms. Especially active are those members of the subclass wherein R' and R'' are each methyl.

Further preferred because of their respective properties are those compounds of the subclasses having the formulae:

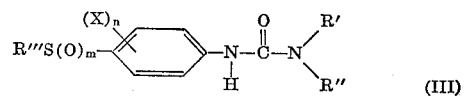

and

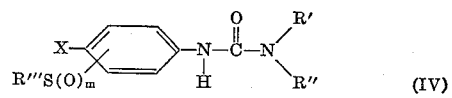

while especially active compounds are those of configuration represented by Formula V:

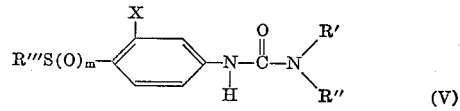

Compounds of the following formula comprise an extremely effective subgroup of herbicides:

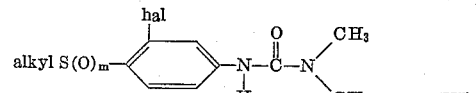

where $m$ is as herebefore described, "alkyl" is alkyl of 1 to 4 carbon atoms and "hal" is middle halogen (chlorine or bromine). A further preferred subclass is represented by the formula:

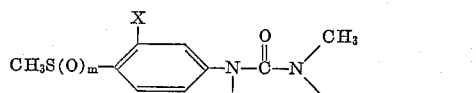

wherein X is middle halogen, chlorine being especially preferred. Also active herbicides result when X is a nitro group. Further active herbicide are those where X is hydrogen.

"$m$" can be 0, 1, or 2 giving thio-, sulfinyl- or sulfonyl-phenylthioureas, respectively, in the formulae above presented which are active herbicides according to this invention.

Examples of compounds of this invention include:

3-(3-bromo-4-(methylthio)phenyl)-1,1-dimethylurea;
3-(3-bromo-4-(methylsulfonyl)phenyl)-1,1,dimethylurea;
3-(3-methyl-4-(methylthio)phenyl)-1,1-dimethylurea;
3-(3-ethoxy-4-(methylthio)phenyl)-1,1-dimethylurea;
3-(2-amino-4-(methylthio)phenyl)-1,1-dimethylurea;
3-(2-dimethylamino-4-methylthio)phenyl)-1,1-dimethylurea;
3-(2-nitro-4-(methylthio)phenyl)-1,1-dimethylurea;
3-(2-cyano-4-(methylthio)phenyl)-1,1-dimethylurea;
3-(4-(methylthio)phenyl)-1,1-dimethylurea;
3-(4-(propylthio)phenyl)-1,1-dipropylurea;
3-(4-(ethylthio)phenyl)-1,1-diethylurea;
3-(5-bromo-2-(methylthio)phenyl)-1,1-dimethylurea;
3-(3-chloro-4-(methylsulfonyl)phenyl)-1,1-dimethylurea;
3-(2-nitro-4-(methylsulfonyl)phenyl)-1,1-dimethylurea;
3-(2-amino-4-(methylsulfinyl)phenyl)-1,1-dimethylurea;
3-(3-bromo-4-(methylsulfinyl)phenyl)-1,1-dimethylurea;
3-(2-cyano-4-(methylsulfinyl)phenyl)-1,1-dimethylurea;
3-(5-amino-2-(methylsulfinyl)phenyl)-1,1-dimethylurea;
3-(3-chloro-2-(methylthio)phenyl)-1-methylurea;
3-(3-methyl-2-(methylthio)phenyl)-1-methylurea;

3-(o-(methylsulfonyl)phenyl)-1-methylurea;
3-(3-chloro-4-(methylsulfonyl)phenyl)-1-methylurea;
3-(3-chloro-4-(methylsulfinyl)phenyl)-1-methylurea;
3-(2-(methylthio)phenyl)-1,1-dimethylurea;
3-(2-(methylsulfinyl)phenyl)-1,1-dimethylurea;
3-(2-(methylsulfonyl)phenyl)-1,1-dimethylurea;
3-(5-chloro-2-(methylthio)phenyl)-1,1-dimethylurea;
3-(5-chloro-2-(methylsulfinyl)phenyl)-1,1-dimethylurea;
3-(5-chloro-2-(methylsulfonyl)phenyl)-1,1-dimethylurea;
3-(4-chloro-2-(methylthio)phenyl)-1,1-dimethylurea;
3-(4-chloro-2-(methylsulfonyl)phenyl)-1,1-dimethylurea;
3-(4-chloro-2-(methylsulfinyl)phenyl)-1,1-dimethylurea;
3-(2-methyl-4-(methylthio)phenyl)-1,1-dimethylurea;
3-(2-methyl-4-(methylsulfinyl)phenyl)-1,1-dimethylurea;
3-(2-methyl-4-(methylsulfonyl)phenyl)-1,1-dimethylurea;
3-(4-methyl-2-(methylthio)phenyl)-1,1-dimethylurea;
3-(4-methyl-2-(methylsulfonyl)phenyl-1,1-dimethylurea;
3-(4-methyl-2-(methylsulfinyl)phenyl)-1,1-dimethylurea;
3-(4-chloro-2-(methylthio)phenyl)-1-methyl-1-methoxyurea;
3-(4-chloro-2-(methylthio)phenyl)-1-methyl-1-ethoxyurea;
3-(4-chloro-2-(methylsulfonyl)phenyl)-1-methyl-1-methoxyurea;
3-(4-chloro-2-(methylsufinyl)phenyl)-1-methyl-1-ethoxyurea;
3-(3-chloro-4-(methylthio)phenyl)-1,1-diisopropylurea;
3-(3-chloro-4-(methylthio)phenyl)-1,1-dibutylurea;
3-(3-chloro-4-(methylsulfonyl)phenyl)-1,1-dibutylurea;
3-(3-chloro-4-(ethylthio)phenyl)1,1-dimethylurea;
3-(3-chloro-4-(isopropylsulfinyl)phenyl)-1,1-dimethylurea;
3-(3-chloro-4-(sec-butylthio)phenyl)-1,1-dimethylurea;
3-(3-chloro-4-(n-pentylthio)phenyl)-1,1-dimethylurea;
3(3-chloro-4-(tert-octylsulfonyl)phenyl-1,1-dimethylurea;
3-(3-chloro-4-(chloromethylthio)phenyl)-1,1-dimethylurea;
3-(3-chloro-4-(trifluoromethylsulfonyl)phenyl)-1,1-dimethylurea;
3-(3-chloro-4-(2-ethoxyethylthio)phenyl)-1,1-dimethylurea;
3-(3-chloro-4-(2-(propylsulfonyl)ethylsulfonyl)phenyl)-1,1-dimethylurea;
3-(4-(allylthio)-3-chlorophenyl)-1,1-dimethylurea;
3-(3-chloro-4-(4-chloro-2-butenylthio)phenyl-1,1-dimethylurea;
3-(3-chloro-4-(2-cyanoethylthio)phenyl)-1,1-dimethylurea;
3-(3-chloro-4-(2-(diethylamino)ethylthio)phenyl)-1,1-dimethylurea;
4-((2-acetamidoethyl)thio-3-chlorophenyl)-1,1-dimethylurea;
3-(chloro-4-(2-nitroethylsulfonyl)phenyl)-1,1-dimethylurea.

This novel class of phenylureas may be prepared from anilines substituted with the alkylthio group. The general scheme for the synthesis of the subject thiophenylureas may be represented as follows:

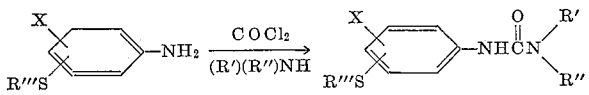

The resulting ureas may be oxidized to the corresponding sulfoxides and sulfones. Oxidation agents such as peracetic acid, chromic acid and m-chloroperbenzoic acid have been found to be particularly effective.

The following examples are presented to show how certain specific compounds of the invention can be prepared and to illustrate the effectiveness of certain compounds of the invention as herbicides. It is to be understood that the examples are for purposes of illustration only, and that the inclusion of the examples is not to be regarded as limiting the scope of the invention.

*Example I.—Preparation of 3-(3-chloro-4-(methylthio)phenyl)-1,1-dimethylurea*

40 grams of 4-(methylthio)-3-chloroaniline (0.23 mole) in 100 milliliters of ethyl acetate was added dropwise over a 40 minute period to 40 grams of phosgene (0.45 mole) in 100 milliliters of ethyl acetate. The addition was exothermic to 38° C. After cooling to room temperature the solvent was evaporated. The solid residue was dissolved in 300 ml. of dry ether and 23 grams of dimethylamine (0.51 mole) was introduced. The product precipitated during the addition. After stirring 15 minutes the solid was filtered and then recrystallized from benzene; 50 grams (89% yield) of 3-(3-chloro-4-(methylthio)phenyl)-1,1-dimethylurea, as a colorless solid with a melting point of 127–129° C. was obtained. The identity of the product was confirmed by elemental analysis (percent by weight):
Calculated: N, 11.5; S, 13.1; Cl, 14.5. Found: N, 11.1; S, 13.0; Cl. 15.3.

*Example II.—Preparation of 3-(5-chloro-2-(methylthio)phenyl)-1,1-dimethylurea*

64 grams of 5-chloro-2-(methylthio)aniline (0.37 mole) in 100 milliliters of ethyl acetate was added dropwise to 100 grams of phosgene (1.0 mole) in 100 milliliters of ethyl acetate. The mixture was heated for 30 minutes to complete the reaction. After evaporation of the solvent, the oily residue was dissolved in 150 milliliters of ether and 25 grams of dimethylamine (0.55 mole) was introduced. The cloudy reaction mixture was clarified by filtration and the filtrate was concentrated to a syrup. It was crystallized from an ether-petroleum ether (1:1) mixture to yield 65 grams (72%) of 3-(5-chloro-2-(methylthio)phenyl)-1,1-dimethylurea as an off white crystalline solid. The identity of the product was confirmed by elemental analysis (percent by weight):
Calculated: N, 11.4; S, 13.1. Found: N, 11.2; S, 12.6.

*Example III.—Preparation of 3-(p-(methylsulfinyl)phenyl)-1,1-dimethylurea*

20 grams of 85% m-chloroperbenzoic acid (0.1 mole) in 125 milliliters of chloroform was added dropwise to 21 grams of 3-(p-(methyl thio)phenyl)-1,1-dimethylurea (0.1 mole) in 50 milliliters of chloroform at −10° C. over a 20 minute period. The mixture was then held at 0° C. for 2 hours and at room temperature and overnight. The solid was filtered and the filtrate was washed with 5% Na$_2$CO$_3$ and saturated NaCl solutions. The chloroform extract was dried over anhydrous magnesium sulfate, filtered then concentrated to yield a white solid. The crude product was recrystallized from acetone giving 10 grams of 3-(p-(methylsulfinyl)phenyl)-1,1-dimethylurea, melting at 159–161° C. The identity of the product was confirmed by elemental analysis (percent by weight):
Calculated: N, 12.4; S, 14.2. Found: N, 12.1; S, 14.2.

*Example IV.—Preparation of 3-(3-chloro-4-(methylsulfonyl)phenyl-1,1-dimethylurea*

29 grams of m-chloroperbenzoic acid (0.145 mole) in 200 milliliters of chloroform was added dropwise over a 45 minute period to 17 grams of 3-(3-chloro-4-(methylthio)phenyl)-1,1-dimethylurea (0.07 mole), as prepared in Example I, in 100 milliliters of chloroform held at 10° C. The reaction mixture was left standing overnight at room temperature then filtered. The filtrate was washed with 10% Na$_2$CO$_3$ and with water, the organic layer was concentrated to a syrup. The syrup was dissolved in a 4:1 ether, methanol solution from which a solid was crystallized out. It was recrystallized from methanol to give 12 grams 3-(3-chloro-4-(methylsulfonyl)phenyl)-1,1-dimethylurea as a colorless solid with a melting point of 155–

156° C. The yield was 62% and the identity of the product was established by elemental analysis (percent by weight):

Calculated: N, 10.1; S, 11.6; Cl, 12.8. Found: N, 10.2; S, 11.6; Cl, 13.2.

*Example V.—Preparation of 3-(3-nitro-4-(methylthio)-phenyl)-1,1-dimethylurea*

45 grams of dimethylamine was added to 45 grams of 4-(methylthio)-3-nitrophenylisocyanate in 600 milliliters of dry ether. After 2 hours stirring at room temperature the solid was filtered off and recrystallized from methanol. 67 grams (89% yield) of 3-(3-nitro-4-(methylthio)phenyl)-1,1-dimethylurea, an orange-red solid was obtained having a melting point of 154–156° C. The identity of the product was established by elemental analysis (percent by weight):

Calculated: N, 16.5; S, 12.5. Found: N, 16.3; S, 12.8.

*Example VI.—Preparation of 3-(4-methyl-3-(methylsulfonyl)phenyl)-1,1-dimethylurea*

1.78 grams of m-chloroperbenzoic acid (8.92 mmoles) in 15 milliliters of chloroform was added to 1 gram of 3-(4-methyl-3-(methylthio)phenyl)-1,1-dimethylurea (4.46 mmoles) in 10 milliliters of chloroform at 5° C. After 30 minutes at this temperature the mixture was left at room temperature for 18 hours. The chloroform solution was then washed with 5% $Na_2CO_3$ solution, dried over magnesium sulfate and concentrated to a white solid. The solid was recrystallized from benzene to give 0.8 gram (70% yield) of 3-(4-methyl-3-(methylsulfonyl)phenyl)-1,1-dimethylurea melting at 112°–117° C. The identity of the product was established by elemental analysis (percent by weight):

Calculated: N, 10.9; S, 12.5. Found: N, 10.8; S, 12.2.

*Example VII*

The pre-emergence herbicide activity of the compounds listed in Table 1 below was evaluated by planting weed seeds in soil treated with the candidate herbicides at the rate of 10 pounds per acre. Seeds of watergrass (*Echinochloa crusgalli*) and cress (*Lepidium sativum*) were germinated in treated soil under controlled conditions of temperature and light for 10–11 days prior to evaluation of the effectiveness of the treatments. At this time, the germination was noted and the treatments were rated on a 0 (no effect) to 9 (all dead) scale. Compounds giving a rating of 7 to 9 are considered promising herbicides.

TABLE 1.—PRE-EMERGENCE SOIL HERBICIDE TESTS

| Test Compound | Weed Control Rating | |
| --- | --- | --- |
| | 10 lbs./Acre Watergrass | 10 lbs./Acre Cress |
| 3-(3-chloro-4-(methylthio)phenyl)-1,1-dimethylurea | 8 | 9 |
| 3-(3-chloro-4-(methylsulfinyl)phenyl)-1,1-dimethylurea | 9 | 9 |
| 3-(4-(methylsulfinyl)phenyl)-1,1-dimethylurea | 8 | 8 |
| 3-(3-chloro-4-(methylsulfonyl)phenyl)-1,1-dimethylurea | 9 | 9 |
| 3-(4-(methylsulfonyl)phenyl)-1,1-dimethylurea | 7 | 9 |
| 3-(3-nitro-4-(methylthio)phenyl)-1,1-dimethylurea | 8 | 9 |
| 3-(4-chloro-3-(methylthio)phenyl)-1,1-dimethylurea | 8 | 8 |
| 3-(3-chloro-4-(n-butylthio)phenyl)-1,1-dimethylurea | 8 | 9 |
| 3-(3-chloro-4-(tert-hexylsulfonyl)phenyl)-1,1-dimethylurea | 8 | 9 |
| 3-(3-chloro-4-(methylthio)phenyl)-1-allyl urea | | 8 |
| 3-(3-trifluoromethyl-4-(methylsulfinyl)phenyl)-1,1-dimethylurea | 8 | 9 |

*Example VIII*

The post-emergence herbicide activity of compounds of the invention was evaluated by spraying dilute suspensions of the compounds in a 1:1 mixture of acetone and water with 0.5% wetting agent on crabgrass (*Digitaria sanguinalis*) and pigweed plants (*Amaranthus sp.*) grown under controlled conditions. After the plants were held for 10–11 days, they were rated for treatment effect on a 0 (no effect) to 9 (total plant kill) scale. Compounds giving a 7–9 rating are considered effective herbicides. The results are set forth in the table below.

TABLE 2.—POST-EMERGENCE SPRAY HERBICIDE TESTS

| Test Compound | Weed Control Rating | |
| --- | --- | --- |
| | 10 lbs./Acre Crabgrass | 10 lbs./Acre Pigweed |
| 3-(3-chloro-4-(methylthio)phenyl)-1,1-dimethylurea | 9 | 9 |
| 3-(3-chloro-4-(methylsulfinyl)phenyl)-1,1-dimethylurea | 8 | 9 |
| 3-(4-(methylsulfinyl)phenyl)-1,1-dimethylurea | 7 | 8 |
| 3-(3-chloro-4-(methylsulfonyl)phenyl)-1,1-dimethylurea | 9 | 9 |
| 3-(3-nitro-4-(methylthio)phenyl)-1,1-dimethylurea | 6 | 9 |
| 3-(4-chloro-3-(methylthio)phenyl)-1,1-dimethylurea | 8 | 9 |
| 3-(3-chloro-4-(iso-butylsulfonyl)phenyl)-1,1-dimethylurea | 9 | 9 |
| 3-(3-chloro-4-(n-octylsulfonyl)phenyl)-1,1-dimethylurea | 9 | 9 |
| 3-(3-chloro-4-(n-dodecylthio)phenyl)-1,1-dimethylurea | 9 | 9 |
| 3-(3-chloro-4-(methylthio)phenyl)-1,1-diallylurea | 7 | 8 |

Different species of the herbicides of this invention exhibit somewhat different herbicidal properties, compared one with another. Further, their activity with respect to different kinds of plants differs considerably, permitting their use as selective herbicides in many cases. When used in relatively high dosages, these herbicides are powerful general herbicides, apparently exhibiting more activity when applied pre-emergence than when applied post-emergence. At lower dosages, the herbicides act selectively.

The phenylurea herbicides of this invention are not very volatile, and tend to remain in that part of the soil into which they are introduced; some may be moved through the soil by water. Consequently, by appropriate selection of the part of the soil into which they are introduced, relative to the seeds of wanted plants, and those of unwanted plants, and taking into account the effect of water, these herbicides can be used to prevent all plant growth, even at relatively low dosages in some cases, or their selectivity can be improved to prevent growth of unwanted plants without harm to wanted plants. For example, as is well known, only those weed seeds which are present within about one-quarter inch of the surface of the soil will germinate, whereas the seeds of cereal, and other, crops, for example, ordinarily are sown about one-half to three-quarters of an inch below the surface of the soil, and germinate well under these conditions. By introducing the herbicide only into the top one-quarter inch of the soil, and avoiding excessive watering, germination of the weed seeds can be prevented, while germination of the crop seeds will not be effected. Thus, even those herbicides of this invention that are not very selective in their action can be used to selectively remove weeds from cereal grains or other crops. Of course, if complete kill of all plants in a given portion of soil is desired, it is necessary only to introduce one or more of the phenylurea herbicides throughout that portion of soil.

The phenylureas are soluble in the common organic horticultural solvents. Thus, according to the intended method of application, the character of the plants involved, and the concentration of herbicide to be used, the herbicidal phenylureas can be formulated as a solution or suspension in water, or a suitable nonphytotoxic organic solvent, as a dispersion or emulsion of the active agent in a non-solvent therefor, as an emulsion of a solution of the active agent in a suitable solvent emulsified with a second, inhomogeneous liquid, or as a solid comprising the active agent or agents sorbed on a sorptive solid carrier. Where a light hydrocarbon oil is to be used as carrier, suitable materials for the purpose include any of the spray oils marketed commercially for this purpose. The highly aromatic hydrocarbons are preferred. Thus, highly refined aromatic hydrocarbons, such as benzene, toluene, xylene, ethylbenzene, cumene or isodurene, may be used, or the carrier may be a less highly refined relatively aromatic hydrocarbon mixture, such as a coal tar fraction, a straight-run petroleum distillate, a thermally or catalytically cracked hydrocarbon oil, platformate, or the like. Suitable solvents may also comprise a relatively aliphatic hydrocarbon material, or mixtures of aromatic and aliphatic hydrocarbons. Suitable aliphatic hydrocarbon materials include refined gas oil, light lubricating oil fractions, refined kerosene, mineral seal oil and the like. Spray oils boiling in the range of from 275° F. to 575° F. are suitable, as are spray oils boiling in the range of from 575° F. to 1000° F. and having an unsulfonatable residue of at least 75%. Mixtures of such spray oils also may be used.

Although the solvent usually will be of mineral origin, oils of animals or of vegetable origin also may be employed in or as the carrier. In appropriate cases oxygenated solvents, such as alcohols, e.g., methanol, ethanol, isopropyl alcohol, n-butyl alcohol and amyl alcohol, ketones, e.g., acetone, methyl ethyl ketone, methyl isobutyl ketone, etc., glycols and glycol ethers and chlorinated solvents may be employed in or as the carrier.

Solutions of the active agents may be applied as such to the plants or to the soil that is to be treated, or they may be suspended in water and the suspension or emulsion applied to the plants or soil. Thus, a relatively concentrated solution of the active agent in a water-immiscible solvent may be prepared, with added emulsifying, dispersing or other surface-active agents, and the concentrate diluted in the spray tank with water to form a uniform fine emulsion which can be applied by conventional spray devices. Emulsions or dispersions of the active agents as such in water may also be prepared and applied.

Suitable emulsifiable concentrates, adapted for dispersion in water to provide a sprayable composition, ordinarily will contain between about 5% by weight and about 50% by weight of active agent dissolved in a hydrocarbon or other suitable water-immiscible solvent. Minor amounts, for example, about 0.5% by weight to about 10% by weight, of emulsifying agents may be included to promote dispersion of the concentrate in water. Suitable emulsifying agents include, among others, alkaryl sulfonates, sulfates of long-chain fatty acids, alkylaryl polyoxyethylene glycol ethers, sulfonated white oils, sorbitan esters of long-chain fatty acids, alkylamide sulfonates and the like. Although both anion- and cation-active wetting and emulsifying agents may be used for this purpose, the non-ionic agents are preferred since the concentrates in which they are present have increased stability and do not suffer phase separation when diluted with hard water. Suitable non-ionic agents which may be used are available commercially as, for example, Triton X-100 and Lissapol N— believed to be condensation products of alkylphenols with ethylene oxide—and Tweens—believed to be condensation products of ethylene oxide and higher fatty acid esters, for example, oleic acid ester of anhydrosorbitols.

Liquid composition of these herbicidal phenylureas suitable for application to plants or to their environment contain the active agent or agents in concentrations generally within the range of from about 0.01% by weight to about 25% by weight.

The invention includes novel solid compositions of matter wherein the active agent or agents are absorbed or adsorbed in or on a sorptive carrier, such as finely divided clay, talc, gypsum, lime, wood flour, Fuller's earth, kieselguhr, or the like. The solid composition, or dust, may contain from as little as 1% by weight of active material to 50% by weight of active material, or even more.

It may be prepared as a dust, or as granules designed to be broadcast or to be worked into the soil. Compositions formulated as wettable powders are particularly suitable. Wettable powders can be prepared suitable for suspension in water with or without the aid of conventional dispersing or deflocculating agents and with or without such adjuvants as oils, stickers, wetting agents, etc.

For field application, the rate of application of the active agent may be varied from about 0.1 to 30 or more pounds per acre. It will be appreciated that the rate of application is subject to variation according to the particular active agent used, the particular species of plants involved, and the local conditions, for example, temperature humidity, moisture content of the soil, nature of the soil, and the like. Effective resolution of these factors is well within the skill of those well versed in the herbicide art.

The herbicidal compositions may contain one or more of the herbicidal phenylureas set out hereinbefore as the sole active agent, or they may contain in addition thereto other biologically active substances. Thus, insecticides, e.g., DDT, endrin, dieldrin, aldrin, chlordane, demeton, methoxychlor, DDVP, naled, Ciodrin® Insecticide and Bridin® Insecticide, rotenone and pyrethrum, and fungicides, such as copper compounds, ferbam, captan, and the like, may be incorporated in the compositions. Further, if desired, the herbicidal compositions may contain fertilizers, trace metals, or the like and when applied directly to the soil may additionally contain nematocides, soil conditioners other plant regulators, such as naphthalene acetic acid, 2,4-dichlorophenoxyactic acid and the like, and/or herbicides of different properties.

We claim as our invention:

1. A compound of the formula:

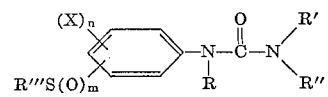

wherein R''' represents a member selected from unsubstituted alkyl of 1 to 12 carbon atoms, alkyl of 1 to 12 carbon atoms substituted by 1 to 3 halogen atoms and alkyl of 1 to 12 carbon atoms substituted by one substituent of the group consisting of alkoxy, cyano, nitro, amino (—NH$_2$), monoalkylamino of 1 to 4 carbon atoms, dialkylamino of 2 to 8 carbon atoms, alkylamido of 2 to 4 carbon atoms, alkenyl and mono-haloalkenyl of 1 to 4 carbon atoms; X is a member of the group consisting of halogen, alkyl of 1 to 4 carbon atoms, alkoxy of 1 to 4 carbon atoms, mono- and poly-haloalkyl of 1 to 4 carbon atoms, unsubstituted amino (—NH$_2$), monoalkylamino of 1–4 carbon atoms, dialkyl amino of 2–8 carbon atoms, nitro, and cyano; $m=0-2$; $n=0-1$; R and R' are each selected from members of the group consisting of hydrogen, alkyl and alkenyl of 1 to 4 carbon atoms; and R'' is selected from the group consisting of alkyl, akenyl and alkoxy of 1 to 4 carbon atoms.

2. A compound according to claim 1 wherein R is hydrogen.

3. A compound according to claim 2 wherein R''' is alkyl of 1 to 12 carbon atoms, R' and R'' are each alkyl of 1 to 4 carbon atoms.

4. A compound according to claim 3 where R' and R'' are each methyl.

5. A compound of the formula:

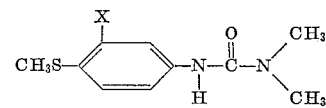

wherein X is selected from the group consisting of chlorine or bromine and nitro.

6. A compound according to claim 5 wherein X is chlorine.

7. A compound according to claim 5 wherein X is nitro.

8. A compound of the formula:

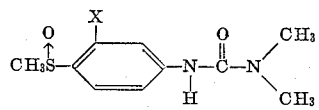

wherein X is chlorine or bromine.

9. A compound according to claim 8 wherein X is chlorine.

10. A compound of the formula:

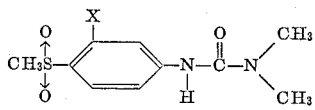

wherein X is chlorine or bromine.

11. A compound according to claim 10 wherein X is chlorine.

12. A compound of the formula:

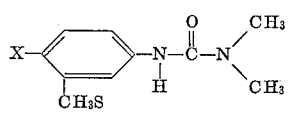

wherein X is chlorine or bromine.

13. A compound according to claim 12 wherein X is chlorine.

14. A compound of the formula:

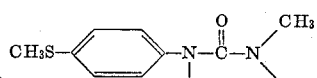

15. A compound of the formula:

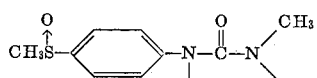

16. A compound of the formula:

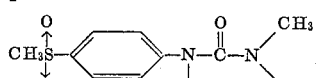

17. A herbicidal composition consisting of:
(a) a compound of the formula:

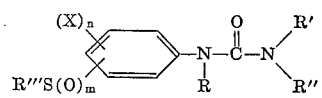

wherein R''' represents a member selected from unsubstituted alkyl of 1 to 12 carbon atoms, alkyl of 1 to 12 carbon atoms substituted by 1 to 3 halogen atoms and alkyl of 1 to 12 carbon atoms substituted by one substituent of the group consisting of alkoxy, cyano, nitro, amino ($-NH_2$), monoalkylamino of 1 to 4 carbon atoms, dialkylamino of 2 to 8 carbon atoms, alkylamido of 2 to 4 carbon atoms, alkenyl and mono-haloalkenyl of 2 to 4 carbon atoms; X is a member of the group consisting of halogen, alkyl of 1 to 4 carbon atoms, alkoxy of 1 to 4 carbon atoms, mono- and poly-haloalkyl of 1 to 4 carbon atoms, unsubstituted amino ($-NH_2$), monoalkylamino of 1–4 carbon atoms, dialkyl amino of 2–8 carbon atoms, nitro, and cyano; $m=0-2$; $n=0-1$; R and R' are each selected from members of the group consisting of hydrogen, alkyl and alkenyl of 1 to 4 carbon atoms; and R'' is selected from the group consisting of alkyl, alkenyl and alkoxy of 1 to 4 carbon atoms.

(b) a inert horticultural diluent therefor.

References Cited

UNITED STATES PATENTS 2,655,447 10/1953 Todd _____ 260—553
2,780,535 2/1957 Snyder _____ 260—553 X

OTHER REFERENCES

Wagner et al.: Annalen Der Chemie, Justus Liebigs, volume 675 (1964), pages 189–199.

Wertheim: J. Amer. Chem. Soc., vol. 53 (1931), pages 200–203.

ALEX MAZEL, *Primary Examiner*.

HENRY R. JILES, *Examiner*.